United States Patent
Bohland

(10) Patent No.: US 7,108,889 B2
(45) Date of Patent: Sep. 19, 2006

(54) GLASS INTERLEAVING MATERIAL AND METHOD

(75) Inventor: John R. Bohland, Oregon, OH (US)

(73) Assignee: Guardian Industries Corp., Auburn Hills, MI (US)

( * ) Notice: Subject to any disclaimer, the term of this patent is extended or adjusted under 35 U.S.C. 154(b) by 0 days.

(21) Appl. No.: 10/852,665

(22) Filed: May 25, 2004

(65) Prior Publication Data

US 2005/0260342 A1 Nov. 24, 2005

Related U.S. Application Data

(63) Continuation-in-part of application No. 10/847,673, filed on May 18, 2004, now abandoned.

(51) Int. Cl.
*B65B 33/00* (2006.01)
(52) U.S. Cl. .................. 427/154; 427/165; 427/180; 427/201; 428/407; 428/421; 428/422; 428/441; 428/442
(58) Field of Classification Search ............... 427/154, 427/165, 180, 201; 428/407, 421, 422, 441, 428/442; 524/313, 394, 400
See application file for complete search history.

(56) References Cited

U.S. PATENT DOCUMENTS

| | | | |
|---|---|---|---|
| 3,723,312 A | 3/1973 | Hay, Jr. ..................... 252/11 |
| 4,011,359 A | 3/1977 | Simpkin et al. ............ 428/326 |
| 4,529,648 A | 7/1985 | Duffer et al. ............... 428/326 |
| 4,529,657 A | 7/1985 | Franz ......................... 428/410 |
| 4,568,605 A | 2/1986 | Duffer et al. ............... 428/326 |
| 4,606,946 A | 8/1986 | Duffer et al. ............... 427/384 |
| 4,797,440 A * | 1/1989 | Schofield et al. ........... 524/239 |
| 5,344,718 A | 9/1994 | Hartig et al. ............... 428/623 |
| 5,514,476 A | 5/1996 | Hartig et al. ............... 428/426 |
| 5,593,786 A | 1/1997 | Parker et al. ............... 428/426 |
| 5,609,924 A | 3/1997 | McCurdy et al. ........... 427/475 |
| 5,994,441 A * | 11/1999 | Anghileri et al. ........... 524/395 |
| 6,220,437 B1 | 4/2001 | Knoy, Jr. et al. ........... 206/454 |
| 6,686,050 B1 | 2/2004 | Lingle et al. ............... 428/432 |

FOREIGN PATENT DOCUMENTS

WO   WO 2004/052763    6/2004

\* cited by examiner

*Primary Examiner*—D. S. Nakarani
(74) *Attorney, Agent, or Firm*—Nixon & Vanderhye P.C.

(57) ABSTRACT

There is provided a technique for interleaving glass sheets (which may or may not be provided with low-E coatings thereon) during shipment, transport, storage, and/or the like. In certain example embodiments, the glass sheet interleaving material includes a mixture of: polymer inclusive beads or particles of material such as polymethymethacrylate, and a stearate such as an acid stearate or the metal salt of an acid stearate. The interleaving material mixture may be applied to the glass sheets in any suitable manner.

36 Claims, 1 Drawing Sheet

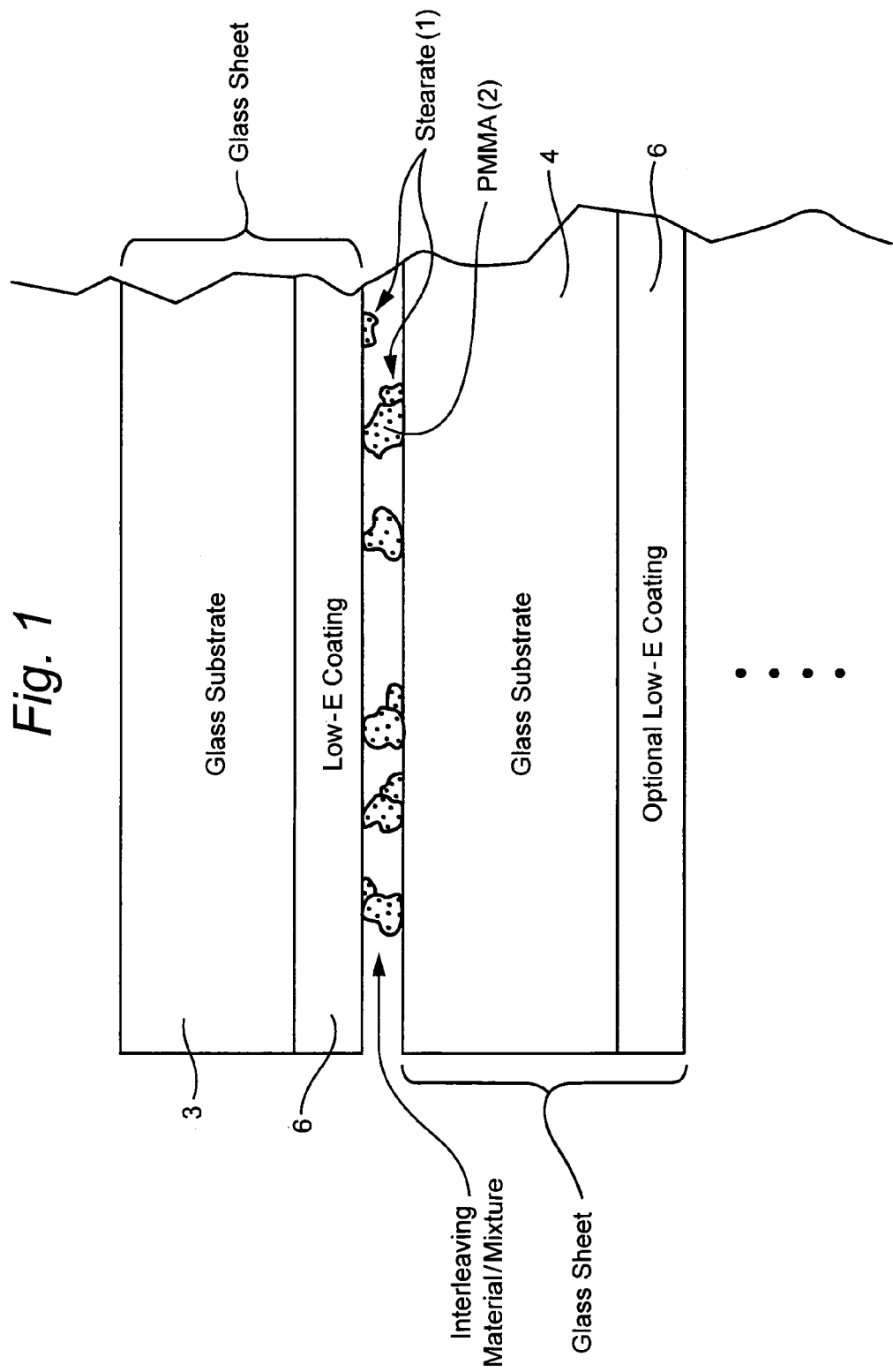

GLASS INTERLEAVING MATERIAL AND METHOD

This application is a continuation-in-part (CIP) of U.S. Ser. No. 10/847,673, filed May 18, 2004 now abandoned, the entire disclosure of which is hereby incorporated herein by reference.

This application relates to a technique for interleaving glass sheets (which may or may not be provided with low-E coatings thereon) during shipment, transport, storage, and/or the like.

BACKGROUND OF THE INVENTION

It is known to use interleaving material for separating glass sheets and protecting them from scratching and the like during shipment, storage and/or the like, particularly when stacked in a conventional manner. Herein, reference to stacked glass sheets means that a plurality of glass sheets (coated or uncoated) are stacked adjacent one another in a face-to-face relationship, irrespective of whether the major glass surfaces are disposed horizontally or vertically or in an intermediate inclined position. In other words, the stacking of glass sheets may be horizontal stacking, vertical stacking, or inclined stacking herein. Stacking of glass may occur on a pallet or the like, as known in the art.

During storage and transport, stacked glass sheets are liable to be damaged due to scratching caused by relative sliding of adjacent glass sheets, particularly when the come into contact with one another during such sliding.

It is known in the art to protect stacked glass sheets from scratching during palletized transport via the positioning of interleaving material between adjacent stacked glass sheets. For example, see U.S. Pat. Nos. 3,723,312, 4,011,359, 4,529,648 and 4,529,657, the disclosures of which are all hereby incorporated herein by reference.

A well known interleaving powder material for placement between stacked glass sheets is known as Lucite (polymethymethacrylate) (e.g., see U.S. Pat. Nos. 3,723,312 and 4,011,359). Lucite or polymethymethacrylate (PMMA) beads or particles are positioned between adjacent stacked glass sheets to protect them from scratching during storage, transport, and the like, and generally work well for their intended purpose.

However, it has been found that polymethymethacrylate beads or particles have a tendency to fall off of stacked glass sheets, especially when the glass sheets are coated with low-E (low-emissivity) coatings or the like. A low-E coating typically includes at least layer of or including silver positioned between at least first and second dielectric layers. Example non-limiting low-E coatings are disclosed in U.S. Pat. Nos. 3,649,359, 5,514,476, 5,344,718, and 6,686,050, the disclosures of which are hereby incorporated herein by reference. This tendency of polymethymethacrylate beads or particles (having a nominal size in the range of 100 to 125 microns) to fall off of (or not stick) coated glass sheets is particularly problematic when such glass sheets are raised vertically for packing on standard glass racks, pallets, or the like, and then subjected to movement and/or vibration.

It is believed that this failure of certain polymethymethacrylate beads or particles to stick to coated glass sheets is due to a lack or dissipation of static surface charge on the low-E coated surfaces of the glass sheets. For example, while static charge may be present at nominal levels on glass coated with a low-E coating, such low-E coated glass is more likely to lose its surface charge if the coating (e.g., at the edge thereof) contacts a ground path. If and when this occurs, there is a reduction or elimination in the electrostatic force which helps keep the polymethymethacrylate beads or particles on the glass (i.e., the beads or particles fall off). It will be recognized that scratching of the glass sheets becomes a problem when the protective polymethymethacrylate beads or particles tend to fall off of stacked glass sheets.

In view of the above, it is apparent that there exists a need in the art to address and solve one or more of the problems discussed above.

BRIEF SUMMARY OF EXAMPLE EMBODIMENTS OF THE INVENTION

In certain example embodiments of this invention, there is provided a technique for interleaving glass sheets (which may or may not be provided with low-E coatings thereon) during shipment, transport, storage, and/or the like. In certain example embodiments, the glass sheet interleaving material includes a mixture of: (a) polymer inclusive beads or particles of material such as polymethymethacrylate, and (b) a stearate such as an acid stearate or the metal salt of an acid stearate. The interleaving material mixture may be applied to the glass sheets in any suitable manner.

Surprisingly, it has been found that the presence of a stearate such as an acid stearate or the metal salt of an acid stearate in the interleaving material significantly improves the adherence of the polymer inclusive beads to the glass sheet(s). In certain example embodiments, it has been found that the stearate such as an acid stearate or the metal salt of an acid stearate advantageously lightly binds or adheres to both the glass (coated or not coated) and the polymer inclusive beads or particles, thereby improving the ability of the protective polymer inclusive beads to stick to the glass during shipment, transport, storage or the like.

In certain example embodiments, the stearate may be of or include calcium stearate. In certain example instances, the calcium stearate may be water insoluble but readily dispersible.

In certain example embodiments of this invention, there is provided a method of spacing glass sheets from one another during stacking of the glass sheets, the method comprising: providing an interleaving material between adjacent glass sheets; and using a mixture comprising each of (a) polymer inclusive beads or particles, and (b) stearate material, for the interleaving material between the adjacent glass substrates.

In other example embodiments of this invention, there is provided an interleaving material for location between adjacent stacked glass sheets, the interleaving material comprising each of polymer inclusive beads or particles, and stearate inclusive material, for location between glass sheets.

In still further example embodiments of this invention, there is provided a combination of stacked glass sheets and interleaving material provided between the stacked glass sheets, wherein the interleaving material is located between adjacent stacked glass sheets, and the interleaving material comprising each of (a) polymer inclusive beads or particles, and (b) a salt of $C_{18}H_{36}O_2$.

In certain other example embodiments, there is provided a method of spacing glass sheets from one another during stacking of the glass sheets, the method comprising: providing an interleaving material between adjacent glass sheets; and using a mixture comprising each of (a) polymer inclusive beads or particles, and (b) palmitic acid, and/or a metal salt inclusive derivative thereof, for the interleaving material between the adjacent glass substrates.

In certain other example embodiments, there is provided a method of spacing glass sheets from one another during stacking of the glass sheets, the method comprising: providing an interleaving material between adjacent glass sheets; and using a mixture comprising each of (a) polymer inclusive beads or particles, and (b) tallow fatty acid(s) and/or a metal salt inclusive derivative thereof, for the interleaving material between the adjacent glass substrates.

BRIEF DESCRIPTION OF THE DRAWINGS

FIG. 1 is a cross sectional view illustrating an interleaving material according to certain example embodiments of this invention provided between first and second stacked glass sheets.

DETAILED DESCRIPTION OF EXAMPLE EMBODIMENTS OF THE INVENTION

In certain example embodiments of this invention, there is provided a technique for interleaving glass sheets (which may or may not be provided with low-E coatings thereon) during shipment, transport, storage, and/or the like. In certain example embodiments, the glass sheet interleaving material includes a dry powder-like mixture of: (a) polymer inclusive beads or particles of material such as polymethymethacrylate, and (b) stearate material such as an acid stearate or the metal salt of an acid stearate. The interleaving material mixture may be applied to the glass sheets in any suitable manner, such as in liquid, aqueous, or dry powder form. However, the mixture ultimately resulting on the glass sheets is typically in dry powder-like form.

Surprisingly, referring to FIG. 1 for example, it has been found that the presence of a stearate 1 such as an acid stearate or the metal salt of an acid stearate in the interleaving material significantly improves the adherence of the polymer inclusive beads 2 to the glass sheet(s). In certain example embodiments, it has been found that the stearate 1 such as an acid stearate or the metal salt of an acid stearate advantageously lightly binds or adheres to both the glass (coated or not coated) 3 and/or 4 and the polymer inclusive beads or particles 2, thereby improving the ability of the protective polymer inclusive beads or particles 2 to stick to the glass 3, 4 during shipment, transport, storage or the like.

In certain example embodiments, the stearate may be of or include calcium stearate. In certain example instances, the calcium stearate may be water insoluble but readily dispersible. In certain example embodiments, the stearate such as an acid stearate or the metal salt of an acid stearate acts as a type of tackifying material to improve bonding of the protective beads or particles 2 to the glass which may or may not be coated in different embodiments of this invention.

It will be appreciated by those skilled in the art that a stearate is a salt and/or ester of stearic acid. Stearic acid may be an acid $C_{18}H_{36}O_2$ in certain example instances. Thus, stearate may be a $C_{17}H_{35}COOM$ (where M is a metal, e.g., a metal ion or cation such as Ca). An example of calcium stearate is $Ca(C_{18}H_{35}O_2)_2$.

Surprisingly, it has been found that what makes stearic acid and its metal salt derivative(s) good for this application are: (a) its long chain aliphatic carbon "tail"—this tends to impart a waxy, sticky, yet lubricating function property; and (b) its polar carboxylic acid (or acid metal salt) "head"—this makes the material hydrophilic so that it will associate with water molecules and wash off easily in a glass washer. Thus, it will be appreciated that other similar long chain aliphatic molecule(s) with a polar end group that can be finely precipitated, ground and/or flaked (and which is solid under processing and use conditions) may also or instead be used as the tackifying material in certain alternative embodiments of this invention. An example alternative tackifying material includes palmitic acid and its metal salt derivatives (note: the carbon chain length is 16 Vs 18 for stearic acid). Other types of tallow fatty acids and salts may also and/or instead be used as the tackifying material in certain other example embodiments of this invention. As stated herein, the tackifying material is preferably in solid form (e.g., powder, ground and/or flakes) in certain example embodiments of this invention.

In certain example embodiments of this invention, it is possible to also add an amount of additional surfactant to the tackifying material to aid with removal with water (e.g., water washing). Typically, stearate (like Lucite) does not "dissolve" in water; instead, it is insoluble but forms a monolayer on top of the water with its polar head pointing down into the water and the fatty end pointing up away from the water.

FIG. 1 illustrates that at least one of the glass sheets includes a low-E coating 6 on a glass substrate. A low-E coating 6 typically includes at least one infrared (IR) reflecting layer of or including silver, gold or the like positioned between at least first and second dielectric layers. Example non-limiting low-E coatings are disclosed in U.S. Pat. Nos. 3,649,359, 5,514,476, 5,344,718, and 6,686,050, the disclosures of which are incorporated herein by reference. As explained above, even though the presence of the conductive layer(s) of the low-E coating may reduce electrostatic charge on the surface of the glass sheet at some locations, the presence of the stearate or the metal salt of an acid stearate 1 acts as a type of tackifying material to improve bonding of the protective beads or particles 2 to the glass. The term glass sheet as used herein includes a structure made up of both the glass substrate and optionally a low-E coating supported by the substrate.

In certain example embodiments of this invention, the interleaving material between the glass sheets may include both the polymer inclusive beads or particles 2 and the stearate particles 1. In certain example embodiments, the stearate is provided in relative small proportions compared to the polymer inclusive beads.

The polymer inclusive beads or particles 2 may be of or include polymethymethacrylate (PMMA) in certain example embodiments of this invention. However, in other embodiments, other materials may be used for beads or particles 2. For example, polymer based or polymer inclusive beads or particles 2 may instead be of or include polyethylene, polystyrene, methacrylate polyester, polytetrafluoroethylene, vermiculite, wood flour and/or the like. In certain example embodiments of this invention, all or a majority of polymer inclusive beads or particles 2 may have a size of from 100 to 125 microns (e.g., diameter if circular).

In certain example embodiments of this invention, the stearate material 1 in the interleaving mixture may be of or include calcium stearate. However, this invention is not so limited, as other stearate materials such as including alkaline earth metal inclusive acid stearates or the metal salts of such acid stearates may also be used for material 1 instead of or in addition to calcium stearate.

In certain example embodiments of this invention, by weight percentage, from about 0.5–50% of the interleaving material mixture comprises the stearate (and/or other suitable material such as palmitic acid and/or metal salt derivative thereof), more preferably from about 0.5–20%, still more preferably from about 0.5–10%, and most preferably from about 0.5 to 5%. The remainder of the interleaving material is of the polymer based beads or particles 2 in certain example embodiments of this invention. An example reason why the ratio of polymer based beads or particles (e.g., Lucite, or the like) dominates the mixture is that the stearate powders or flakes (or other suitable material) can be powdered to a particle size very much less (e.g., twice as small or smaller) than the relatively large Lucite or other spacer material beads. Lucite has a fairly broad particle size range in certain example instances, but roughly averages from 100 to 150 microns in certain example embodiments. The stearate powder (or other suitable material discussed herein) can be ground to a few microns or smaller (e.g., from 0.5 to 4 microns), providing sufficient surface area to coat the Lucite or the like at a low proportion.

An example was made and tested as follows. A 12" by 12" sample of low-E coated glass with a sheet resistance of about 2 ohms/square was provided. PMMA beads were applied to a first half of the sheet, and to the other half of the sheet were applied a mixture of PMMA beads and calcium stearate. The glass sheet was then positioned vertically and tapped on a laboratory benchtop. After tapping of the glass sheet on the laboratory benchtop, it was observed that many more PMMA beads still remained on the half of the sheet which included the calcium stearate (compared to the half which did not where more had fallen off). This example clearly showed that a small proportion of calcium stearate helped the PMMA polymer based particles stay on the coated glass. The material easily washes off with water and/or the like.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method of spacing glass sheets from one another during stacking of the glass sheets, the method comprising;
   providing an interleaving material between adjacent glass sheets; and
   wherein the interleaving material is a mixture comprising each of (a) polymer beads or particles, and (b) stearate material.

2. The method of claim 1, wherein the stearate material comprises a metal salt of a stearic acid.

3. The method of claim 1, wherein the stearate material is at least one alkaline earth metal salt of a stearic acid.

4. The method of claim 1, wherein the stearate material is a calcium stearate.

5. The method of claim 1, wherein the polymer beads or particles comprise polymethylmethacrylate.

6. The method of claim 1, wherein the polymer beads or particles comprise at least one of: polymethylmethacrylate, polyethylene, polystyrene, or polytetrafluoroethylene.

7. The method of claim 1, wherein the stearate adheres to each of the glass sheets and the polymer beads or particles, thereby improving adherence of the polymer beads or particles to the glass sheets.

8. The method of claim 1, wherein at least one of the glass sheets comprises a low-E coating supported by a glass substrate.

9. The method of claim 8, wherein the low-E coating comprises at least one layer comprising silver sandwiched between at least first and second dielectric layers.

10. The method of claim 1, wherein from 0.5 to 10% of the mixture for the interleaving material is of the stearate material.

11. The method of claim 1, wherein from 0.5 to 5% of the mixture for the interleaving material is of the stearate material.

12. The method of claim 1, wherein the stearate material comprises a salt of a stearic acid $C_{18}H_{36}O_2$.

13. The method of claim 1, wherein the interleaving material consists essentially of (a) and (b).

14. A method of spacing glass sheets from one another during stacking of the glass sheets, the method comprising:
   providing an interleaving material between adjacent glass sheets; and
   wherein the interleaving material is a mixture comprising each of (a) polymer beads or particles, and (b) stearic acid.

15. A method of spacing glass sheets from one another during stacking of the glass sheets, the method comprising:
   providing an interleaving material between adjacent glass sheets; and
   wherein the interleaving material comprises a mixture of (a) polymer beads or particles, and (b) palmitic acid and/or a metal salt thereof.

16. The method of claim 15, wherein from 0.5 to 5% of interleaving material is the palmitic acid and/or a metal salt thereof.

17. A method of spacing glass sheets from one another during stacking of the glass sheets, the method comprising:
   providing an interleaving material between adjacent glass sheets; and
   wherein the interleaving material comprises a mixture of (a) polymer beads or particles, and (b) tallow fatty acid(s) and/or a metal salt thereof.

18. The method of claim 17, wherein from 0.5 to 5% of the mixture of the interleaving material is the tallow fatty acid(s) and/or metal salt thereof.

19. The method of claim 17, wherein the interleaving material consists essentially of (a) and (b).

20. A combination of stacked glass sheets and interleaving material located between adjacent stacked glass sheets, wherein the interleaving material comprises a mixture of (a) beads or particles comprised of polymer, and (b) stearate material.

21. The combination of stacked glass sheets and interleaving material of claim 20, wherein the stearate material is a metal salt of a stearic acid.

22. The combination of stacked glass sheets and interleaving material of claim 20, wherein the stearate material is at least one alkaline earth metal salt of a stearic acid.

23. The combination of stacked glass sheets and interleaving material of claim 20, wherein the stearate material comprises calcium stearate.

24. The combination of stacked glass sheets and interleaving material of claim 20, wherein the beads or particles comprise polymethylmethacrylate.

25. The combination of stacked glass sheets and interleaving material of claim 20, wherein the beads or particles are made of at least one of: polymethylmethacrylate, polyethylene, polystyrene, or polytetrafluoroethylene.

26. The combination of stacked glass sheets and interleaving material of claim 20, wherein the stearate material is for adhering to each of the glass sheets and the beads or particles, thereby for improving adherence of the beads or particles to the glass sheets.

27. The combination of stacked glass sheets and interleaving material of claim 20, wherein from 0.5 to 10% of the mixture for the interleaving material is of the stearate material.

28. The combination of stacked glass sheets and interleaving material of claim 20, wherein from 0.5 to 5% of the mixture for the interleaving material is of the stearate material.

29. The combination of stacked glass sheet and interleaving material of claim 20, wherein the stearate material comprises a salt and/or ester of stearic acid $C_{18}H_{36}O_2$.

30. A combination of stacked glass sheets and interleaving material provided between the stacked glass sheets, comprising:

the interleaving material is located between adjacent stacked glass sheets, and the interleaving material comprises a mixture of (a) polymer inclusive beads or particles, and (b) a salt of a stearic acid $C_{18}H_{36}O_2$.

31. The combination of claim 30, wherein at least one of the glass sheets comprises a low-E coating supported by a glass substrate.

32. The combination of claim 31, wherein the low-E coating comprises at least one layer comprising silver sandwiched between at least first and second dielectric layers.

33. The combination of claim 30, wherein the salt of stearic acid $C_{18}H_{36}O_2$ at least one alkaline earth metal salt of said stearic acid.

34. The combination of claim 30, wherein (b) is a metal-salt of $C_{18}H_{36}O_2$.

35. The method of claim 1, wherein the stearate material comprises $Ca(C_{18}H_{35}O_2)_2$.

36. The combination of stacked glass sheets and interleaving material of claim 20, wherein the stearate material is a calcium stearate or $Ca\ (O-C(O)-C_{17}H_{35})_2$.

* * * * *